(12) United States Patent
Diab

(10) Patent No.: US 7,554,466 B1
(45) Date of Patent: Jun. 30, 2009

(54) MULTI-SPEED BURST MODE SERIALIZER/DE-SERIALIZER

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/950,566

(22) Filed: Dec. 5, 2007

(51) Int. Cl.
*H03M 9/00* (2006.01)

(52) U.S. Cl. ........................... 341/100; 341/101

(58) Field of Classification Search ............... 341/100, 341/101; 398/63, 99, 100, 98; 375/355
See application file for complete search history.

(56) References Cited

U.S. PATENT DOCUMENTS

| | | | | |
|---|---|---|---|---|
| 5,150,247 | A * | 9/1992 | Sharpe et al. | 398/98 |
| 5,457,560 | A * | 10/1995 | Sharpe et al. | 398/100 |
| 6,094,532 | A | 7/2000 | Acton et al. | |
| 6,741,107 | B2 | 5/2004 | Borkar et al. | |
| 6,785,354 | B1 | 8/2004 | Dietrich | |
| 7,227,918 | B2 * | 6/2007 | Aung et al. | 375/355 |
| 7,272,321 | B1 * | 9/2007 | Kuo et al. | 398/99 |
| 2004/0151272 | A1 | 8/2004 | Kenney et al. | |
| 2005/0216654 | A1 | 9/2005 | Barth et al. | |
| 2008/0050118 | A1 * | 2/2008 | Haran et al. | 398/63 |

OTHER PUBLICATIONS

Wael William Diab and Howard M. Frazier, "Ethernet in the First Mile: Access for Everyone," IEEE, Chapter 8, pp. 240-269, 2006.

* cited by examiner

*Primary Examiner*—Jean B Jeanglaude
(74) *Attorney, Agent, or Firm*—Duane S. Kobayashi

(57) ABSTRACT

A multi-speed burst mode serializer/de-serializer (SerDes) is configurable and can operable in one of a plurality of operating modes. The plurality of operating modes correspond to the reception of signals from optical network units that operate at different nominal speeds. These various modes of operation can enable a single SerDes design to apply to a variety of speeds and network configurations (e.g., point-to-point or point-to-multipoint). In one example, the design can be initially configured for operation with a single ONT or a network of ONTs at a single speed, or can be dynamically configured during operation for use with a network of ONTs operating at different speeds.

20 Claims, 7 Drawing Sheets

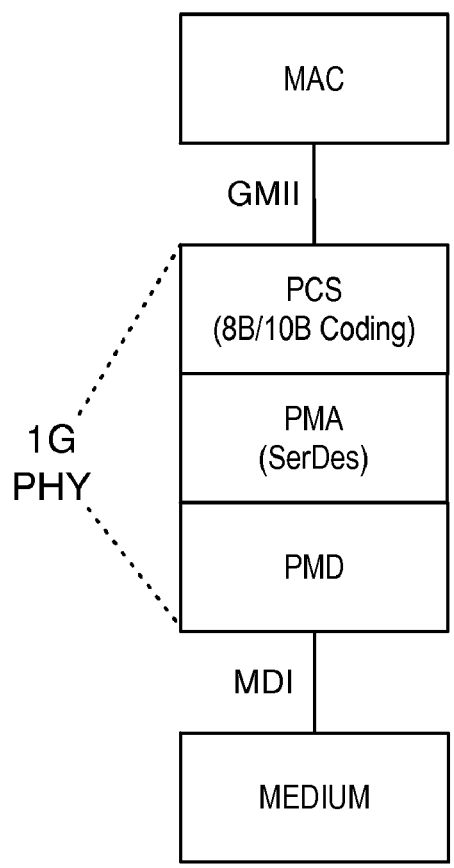
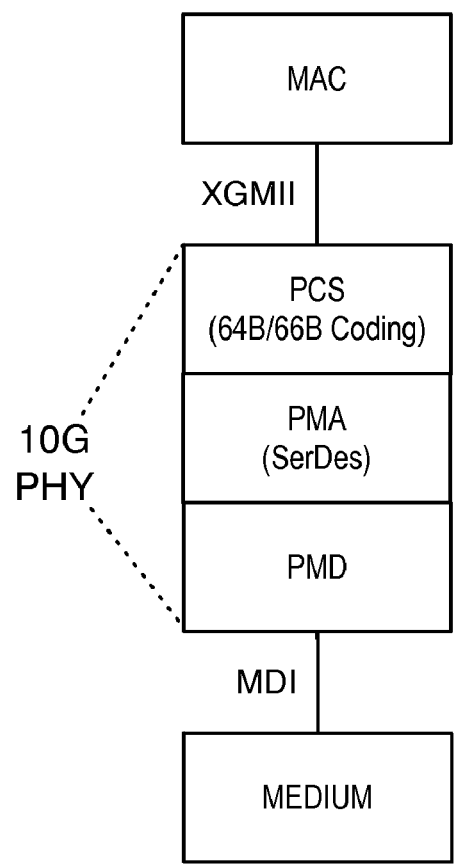
FIG. 1A
FIG. 1B

MULTI-SPEED BURST MODE SERIALIZER/DE-SERIALIZER

BACKGROUND

1. Field of the Invention

The present invention relates generally to a serializer/de-serializer (SerDes) and, more particularly, to a multi-speed burst mode SerDes.

2. Introduction

A SerDes is an integrated circuit (IC or chip) transceiver that converts parallel data to serial data and vice-versa. The transmitter section has parallel data lines coming in and a serial output data stream. For example, a SerDes in a gigabit Ethernet system would include 10 parallel data lines that can be clocked at 125 Mhz, with the resulting serial output clocked at 1.25 Ghz. The gigabit Ethernet SerDes would commonly use an 8B/10B coding scheme that maps 8-bit symbols to 10-bit symbols to achieve DC-balance on the line. As would be appreciated, the receiver section is the reverse of the transmitter section and would have a serial data stream coming in with parallel data lines coming out. The receiver section would also recover the clock embedded in the received signal for use in the decoding process.

FIG. 1A illustrates an example implementation of a SerDes within a gigabit Ethernet physical layer device (PHY). As illustrated, the gigabit Ethernet PHY includes a physical coding sublayer (PCS), a physical medium attachment (PMA), and physical media dependent (PMD). The PCS is generally responsible for encoding/decoding gigabit media independent interface (GMII) octets to/from ten-bit code-groups (8B/10B) for communication with the underlying PMA. Similarly, FIG. 1B illustrates the implementation of a SerDes component within a 10G PHY. As illustrated, the 10G Ethernet PHY's PCS is generally responsible for encoding/decoding 10 gigabit media independent interface (XGMII) 64-bit data to/from 66-bit code-groups (64B/66B) for communication with the underlying PMA.

In general, the PMA abstracts the PCS from the physical medium. Accordingly, the PCS can be unaware of whether the medium is copper or fiber. The primary functions of the PMA include mapping of transmit and receive code-groups between the PCS and PMA, serialization/de-serialization of code-groups for transmission/reception on the underlying serial PMD, recovery of clock from the coded data (e.g., 8B/10B, 64B/66B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

As noted above, the PMA is responsible for the recovery of the received clock, which is used by the PCS to sample the data presented to it by the PMA. Conventional clock recovery mechanisms use delay locked loops (DLLs) or phase locked loops (PLLs) that align a local clock's phase to the phase of the recovered clock.

For point-to-point systems, the locking to an incoming embedded clock is a one-time event prior to the communication of data across the link. For this reason, the process of locking to an incoming embedded clock need not be bounded by a particular locking time requirement. As would be appreciated, the relaxed timing requirement for locking to an incoming embedded clock can relax the design requirements of the SerDes.

In a point-to-multipoint system such as an Ethernet passive optical network (EPON), a single optical line terminal (OLT) at a head end can be designed to communicate with a plurality of optical network units (ONTs) at various end nodes. This arrangement leverages a shared fiber optic plant by multiple networking nodes. Typically, the OLT broadcasts its transmissions in the downstream direction to all the ONTs. Each of the ONTs, on the other hand, transmit in the upstream direction to the OLT. It should be noted that the OLT and ONTs need not transmit at the same signaling rate or bandwidth. It should also be noted that the ONTs can be designed to share bandwidth or use a different wavelength in the upstream direction to eliminate overlap.

In receiving a plurality of individual communications from the various connected ONTs, some of which may be transmitting at different rates, the SerDes in the OLT is required to acquire phase and frequency for each of the individual ONT communications. What is needed therefore is a SerDes design that can operate in a multi-speed burst mode.

SUMMARY

A multi-speed burst mode serializer/de-serializer, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 1A and 1B illustrate implementations of a SerDes component within gigabit and 10G Ethernet physical layer devices.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

A SerDes enables a quick and reliable transfer of data from one physical location to another. Here, data that exists in a parallel bus form is serialized to a single high-speed signal. In addition to the use of a SerDes in point-to-point systems, SerDes have also been incorporated into point-to-multipoint solutions.

Figure 2:
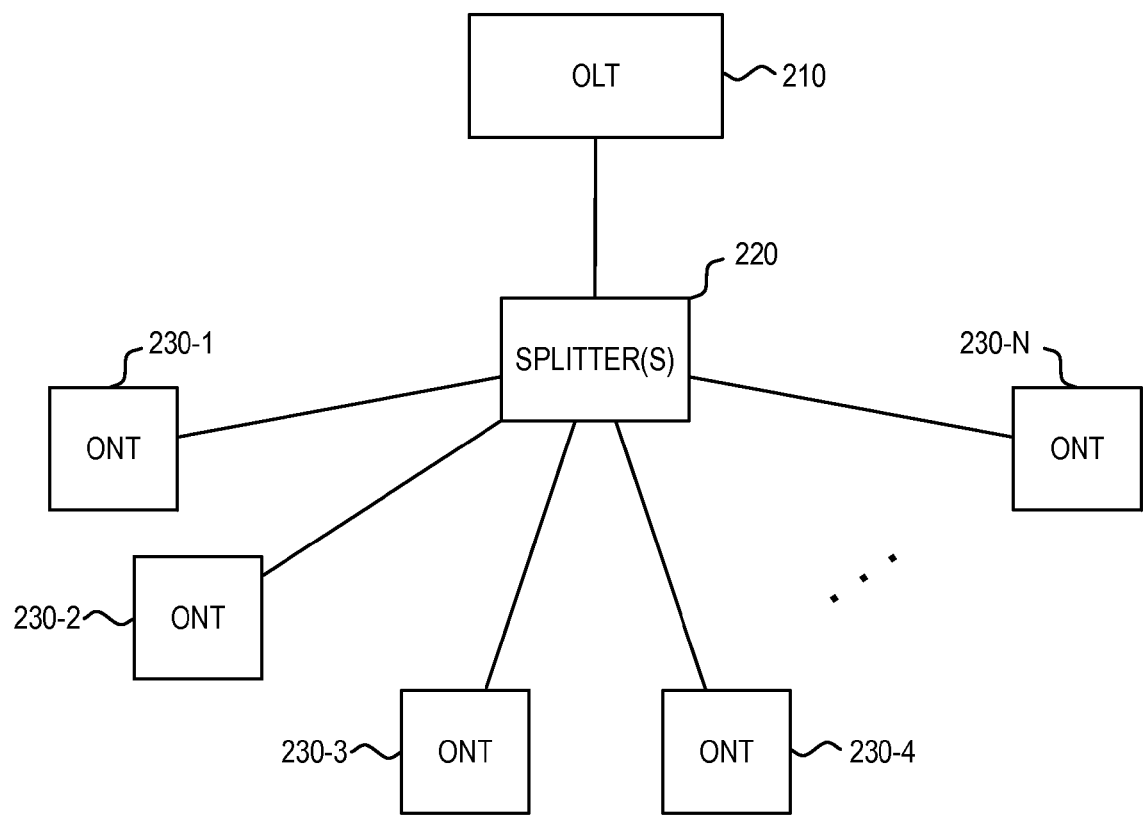
FIG. 2 illustrates an example of a point-to-multipoint communication network.

FIG. 2 illustrates an example of a point-to-multipoint communication network. As illustrated, the point-to-multipoint network includes a single OLT 210 that communicates to a plurality of ONTs 230-n via a PON. The illustrated PON includes splitter(s) 220, which enable a single feeder cable to be split into multiple drop cables for the individual ONTs 230-n. In one embodiment, a single splitter (e.g., 1:16) is used. In another embodiment, two stages of splitting can be used. For example, a single 1:2 splitter can be combined with two 1:8 splitters to accommodate 16 separate drop cables.

Figure 3A:
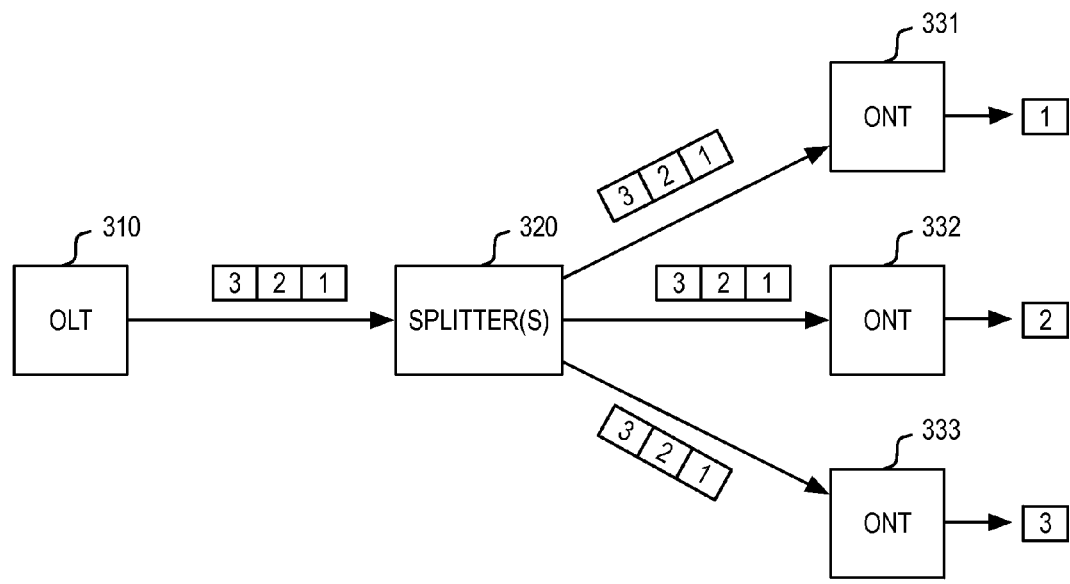
FIGS. 3A-3C illustrate the communication between a single head end OLT and a plurality of end node ONTs.
Figure 3B:
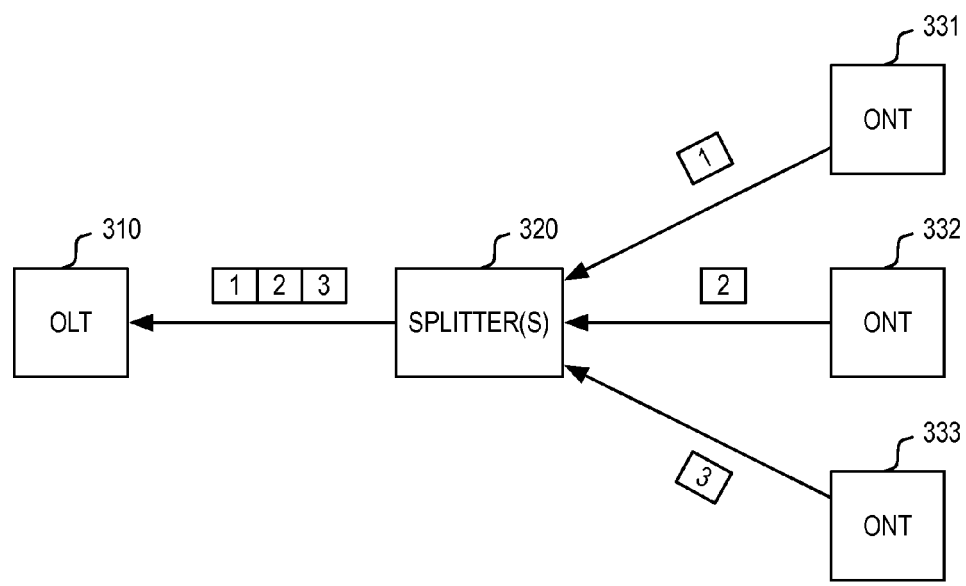

The advantage of the PON is that it allows sharing of the fiber optic plant by multiple network nodes. FIGS. 3A and 3B illustrate an example of the downstream and upstream communication between a single head end OLT and a plurality of end node ONTs in an Ethernet PON (EPON). In the downstream direction illustrated in FIG. 3A, OLT 310 transmits packets 1, 2, 3 for each of the respective connected ONTs 331, 332, 333. As illustrated, each of ONTs 331, 332, 333 receive the stream of packets, wherein each of ONTs, 331, 332, 333 are responsible for extracting the particular packet that is destined for that location.

In the upstream direction illustrated in FIG. 3B, each of ONTs 331, 332, 33 transmit their own packets back to OLT 310. In this upstream communication process, ONTs 331, 332, 333 are designed to transmit in a way to avoid collisions between the packets. In the illustrated example, the PON uses a time division multiple access (TDMA) communication protocol. In this way, the individual packet communications from ONTs 331, 332, 333 would be designed to fit into assigned time slots for transmission to OLT 310. In another example, collisions can be avoided through the transmission by the various ONTs 331, 332, 333 on distinct frequencies. In one embodiment, wavelength division multiplexing (WDM) PONs can be used. As would be appreciated, various hybrid networks can also be used such that multiple speeds/frequencies exist on the network.

Figure 3C:
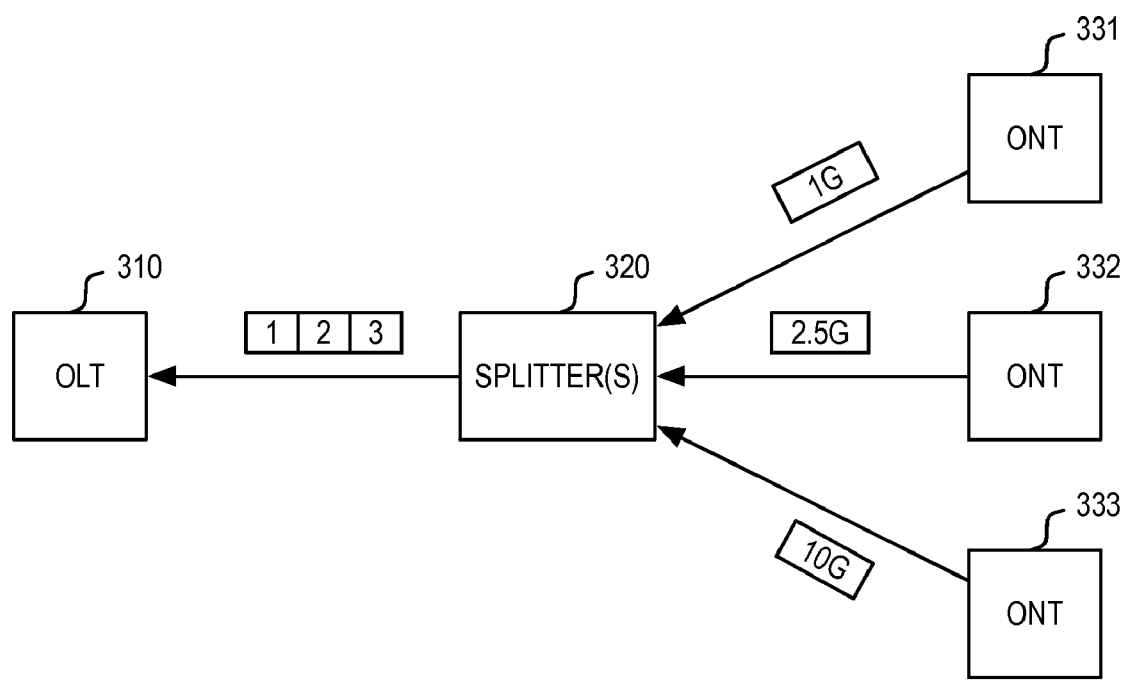

In general, the various ONTs in a PON need not transmit at the same signaling rate or bandwidth. In the illustration of FIG. 3C, the PON network can be populated with ONTs that operate at different speeds. In the illustrated example, ONT 331 is designed to operate at a nominal rate of 1G, ONT 332 is designed to operate at a nominal rate of 2.5G, and ONT 333 is designed to operate at a nominal rate of 10G. This intermixed network can be the result of the natural progression of deployment of new generations of ONTs that are added to an existing mix of prior-generation ONTs. For example, the first deployment generation may have consisted of 1G ONTs. Later generations of 2.5G and 10G could have been added to the existing 1G network to create a mix of ONTs. Enabling this intermixing would therefore provide an upgrade path, and eliminate the large expense of converting an already installed base of ONTs.

It is a feature of the present invention that a SerDes can be designed to operate in a point-to-multipoint network where multiple transmit speeds are used by the various ONTs in their burst mode communication. In the context of FIG. 3B, a SerDes can be provided in OLT 310 that is responsive to the different transmit speeds of ONTs 331, 332, 333. For example, ONT 331 can be designed to transmit at a 1G speed, ONT 332 can be designed to transmit at a 2.5G speed, and ONT 333 can be designed to transmit at a 10G speed. At OLT 310, the SerDes can be designed with the capability to distinguish between the different transmit speeds that are used in the upstream direction.

Figure 4:
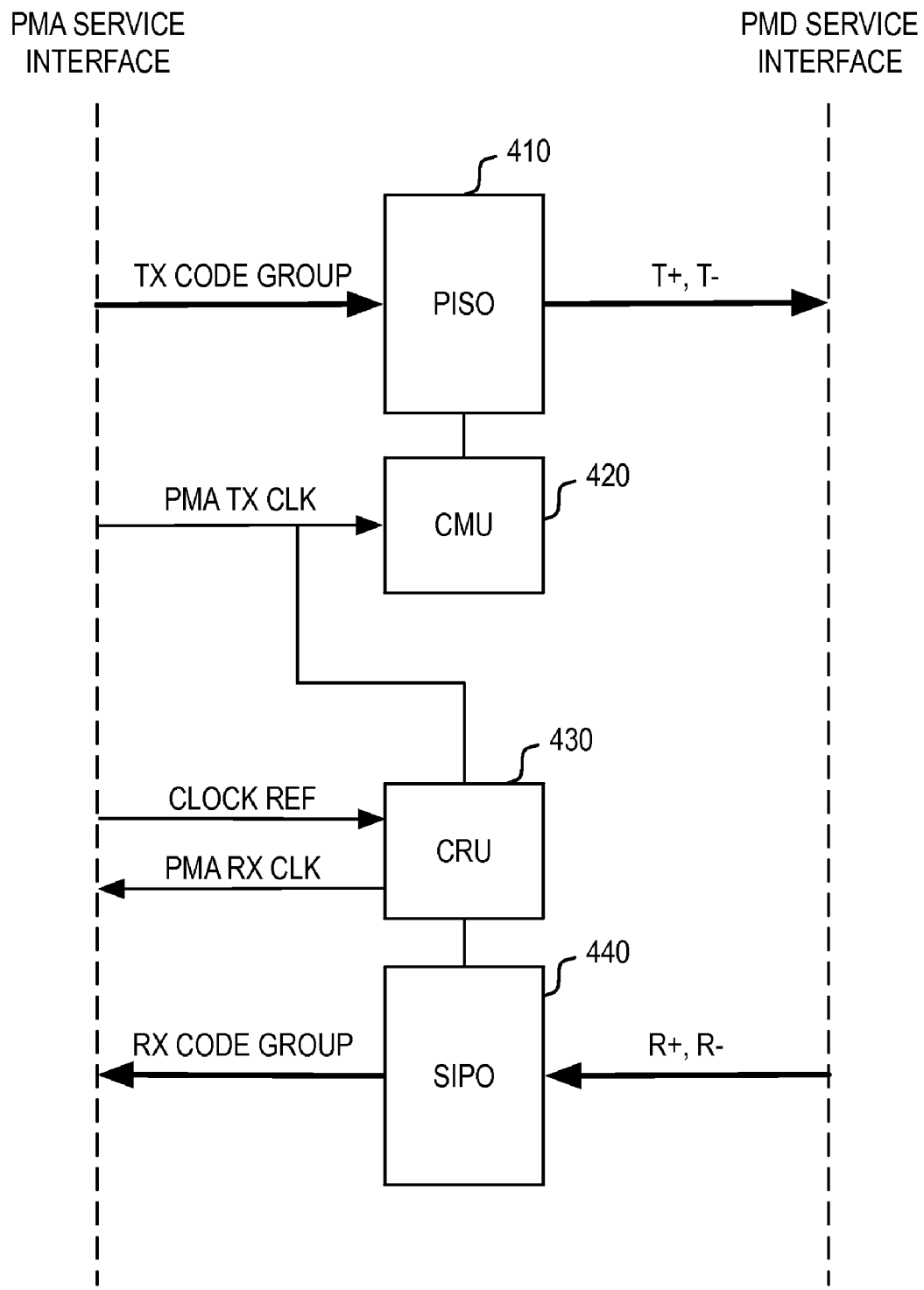
FIG. 4 illustrates an example embodiment of the SerDes functionality in a PMA.

As noted, the SerDes functionality is typically implemented in the PMA. FIG. 4 illustrates an example embodiment of the SerDes functionality in a PMA. As illustrated, the PMA includes parallel-in-serial-out (PISO) block 410 that takes the TX code group output from the PCS and generates a serial output for the PMD. The operation of PISO 410 is based on a clock signal generated by clock multiplier unit (CMU) 420, which multiplies the incoming parallel PMA TX clock. In one embodiment, PISO 410 has a single shift register that receives the parallel data once per parallel clock and shifts it out at the higher serial clock rate.

For a gigabit Ethernet system, the TX code group would be generated by an 8B/10B encoder, with PISO 410 operating in accordance with a 125 Mhz clock multiplied by 10 to produce a 1.25 Ghz clock. For a 10G Ethernet system, the TX code group would be generated by a 64B/66B encoder, with PISO 410 operating in accordance with a 644.5 Mhz clock multiplied by 16 to produce a 10.3125 Ghz clock.

On the receive side, the PMA includes serial-in-parallel-out (SIPO) block 440 that takes the serial input from the PMD and generates the RX code group for the PMA. The RX code group is processed by the PCS in accordance with an embedded clock in the received signal. This recovered clock signal is generated by clock recovery unit (CRU) 430, which divides the incoming clock down to the parallel rate for output to the PCS. In one embodiment, the operation of CRU 430 is based on a delay locked loop (DLL) or a phase locked loop (PLL). As would be appreciated, the specific location of the DLL/PLL within the PHY would be implementation dependent.

In a burst mode, the DLL/PLL would enable the SerDes to perform a separate lock onto each individual communication stream from the various ONTs. As a conventional PON system would include ONTs that operate at the same speed, the SerDes can be optimized for operation at that speed. Where ONTs having different nominal speeds (e.g., 1G, 10G, etc.) are intermixed onto the same PON system, however, a different SerDes design is needed.

Figure 5:
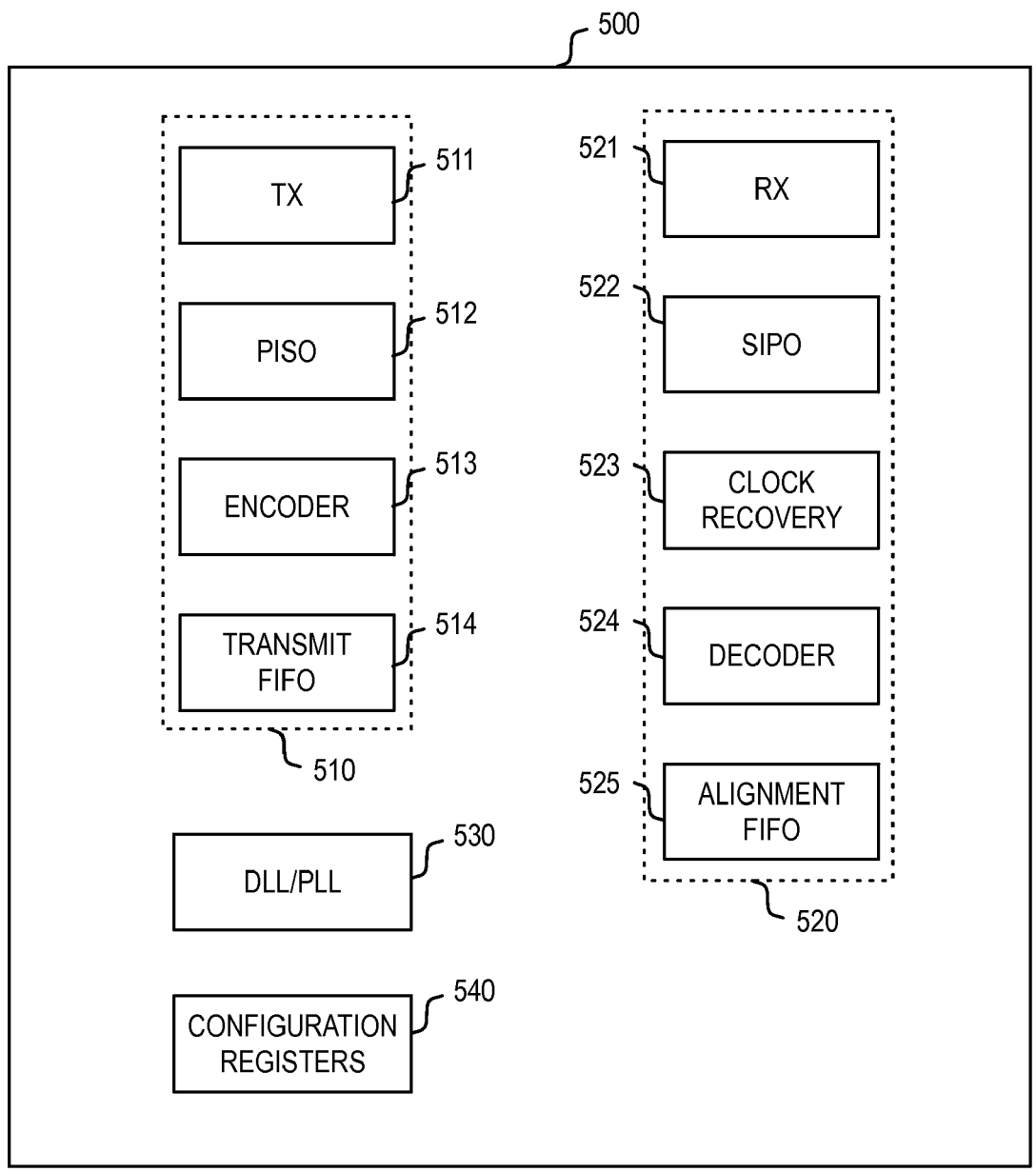
FIG. 5 illustrates a PHY that can be configured for use in multiple operation modes.

FIG. 5 illustrates an embodiment of a multi-speed burst mode SerDes that is designed for use in a PON system having ONTs operating at different nominal speeds. As illustrated, SerDes transceiver 500 includes transmitter section 510 and receiver section 520. Transmitter section 510 includes transmitter 511, PISO 512, encoder (e.g., 8B/10B, 64B/66B, etc.) 513, and transmit FIFO 514. Receiver section 520 includes receiver 521, SIPO 522, clock recovery 523, decoder (e.g., 8B/10B, 64B/66B, etc.) 524, and alignment FIFO 525.

As FIG. 5 further illustrates, SerDes transceiver 500 also includes DLL/PLL 530, which can be used by components in transmitter section 510 and receiver section 520. As would be appreciated, DLL/PLL 530 can be implemented as a common functional block for SerDes transceiver 500 or as a transmitter/receiver specific component.

In accordance with the present invention, DLL/PLL 530 of the present invention can be used to recover the embedded clock signals in communications from ONTs operating at different nominal speeds. For example, DLL/PLL 530 can be used to recover a clock from a first ONT operating at a 1GEPON speed and to recover a clock from a second ONT operating at a 10GEPON speed. As such, the DLL/PLL of SerDes transceiver 500 is a programmable DLL/PLL that can be set to run at a desired clock speed. This can be accomplished, for example, through the configuration of a particular multiplier/divider using configuration registers 540. In one embodiment, configuration registers 540 represent a common functional block that enables storage of configuration parameters that can be used to configure receiver section 520 to receive signals from ONTs of varying speeds, and to configure transmitter section 510 to transmit at different speeds and/or frequencies. In addition to DLL/PLL configuration parameters, configuration registers 540 can also store parameters for other transceiver specifications such as jitter optically and on the electrical output signaling up or downstream. In one embodiment, the configuration parameters in configuration registers 540 can be programmed through a management interface (not shown).

In one embodiment, SerDes transceiver 500 can also be configured with one or more external pins and/or EPROM and/or inband communication that can dictate SerDes transceiver operation depending on a mode of operation. For example, one or more external pins can be used to signal that a 1G or 10G stream is arriving.

Figure 6:
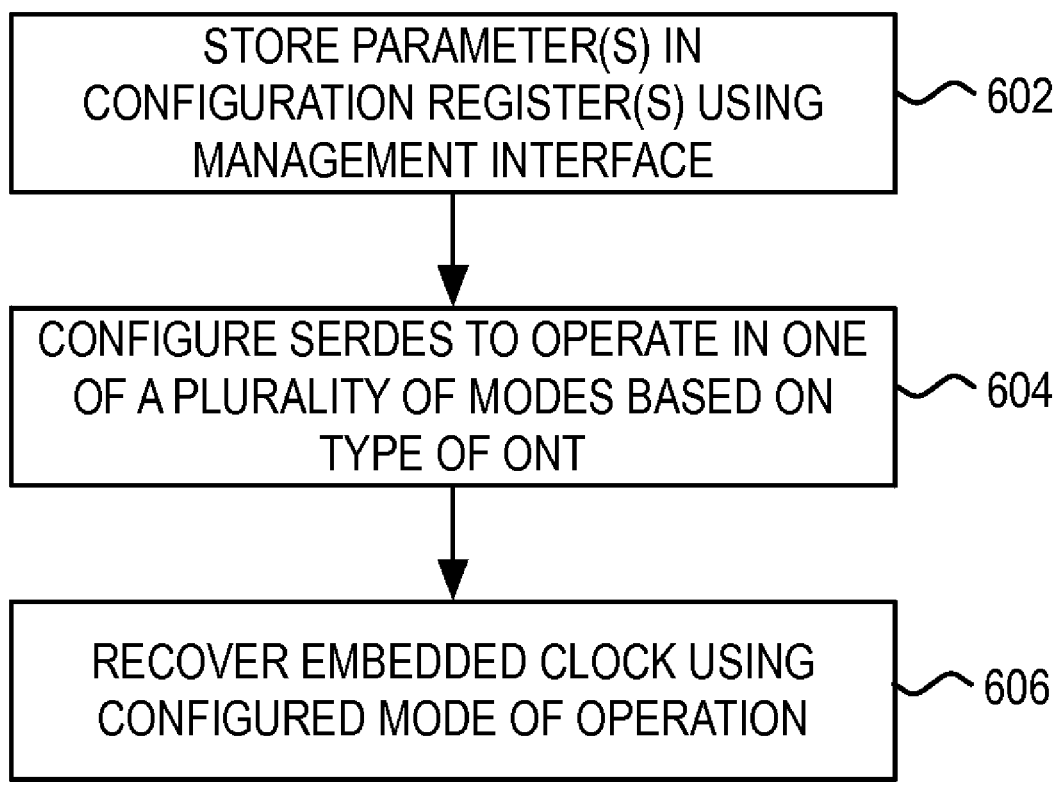
FIG. 6 illustrates a flowchart of a process for configuring a SerDes component for use in one of multiple modes.

To illustrate the flexibility of operation in the SerDes transceiver of the present invention, reference is now made to the flowchart of FIG. 6. As illustrated, the process begins at step 602 where one or more parameters received via a management interface are stored in the configuration register(s). In one example, these configuration registers can be loaded upon an identification of the particular types of ONTs with which the OLT will be communicating. For instance, if the SerDes is to be used in a point-to-multipoint system having 1G and 10G ONTs, then the configuration register(s) can be loaded with parameters (e.g., DLL/PLL specifications) that enable configuration of the SerDes for use with 1G and 10G transmission/reception.

After the configuration register(s) are set, the SerDes can then be flexibly configured in real time during burst-mode operation. This flexible configuration is based on an identification of the ONTs with which the OLT is communicating. At step 604, the SerDes is configured to operate in a particular operating mode based on an identified type of ONT. For example, the SerDes can be configured to receive a 1G communication in a first time slot associated with a first ONT of a 1G type, and reconfigured to receive a 10G communication in a second time slot associated with a second ONT of a 10G type. In this process, the SerDes can be continually reconfigured between multiple speeds to accommodate the various ONTs communicating upstream. As would be appreciated, upstream communications can be distinguished through time and/or frequency.

While the particular type and manner of speed configuration of the SerDes would be implementation dependent, the configurability of the present invention enables an embedded clock to be recovered at step 606 using a configured mode of operation. In the above example, the embedded clock can be recovered from a 1G communication in the first time slot and from a 10G communication in the second time slot. Significantly, a single SerDes is used to recover the embedded clock from different signal speed communications, this being enabled by the multi-speed configurability of the SerDes of the present invention.

As has been described, a SerDes mechanism has been provided that enables a single SerDes design to be applied to various modes of operation. These various modes of operation can enable a single SerDes design to apply to a variety of speeds and network configurations (e.g., point-to-point or point-to-multipoint). In one example, the design can be initially configured for operation with a single ONT or a network of ONTs at a single speed, or can be dynamically configured during operation for use with a network of ONTs operating at different speeds.

It should be noted that the principles of the present invention outlined above can be applied to various contexts. For example, the principles of the present invention can be used with ONTs of different standard or non-standard network speeds (e.g., 1G, 2.5G, 10G, 40G, 100G, etc.), and various point-to-multipoint networks (e.g., APON, BPON, GPON, GEPON, proprietary PONs such as 100M PON, 2.5GPON, etc.).

It should also be noted that a SerDes according to the present invention can be implemented in various ways. In one embodiment, the SerDes can be embodied as a standalone component. In other embodiments, the SerDes can be packaged with a MAC, on the same die with a MAC, packaged with a PMD and/or on the same die as the receiver circuitry in the PMD.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A multi-speed serializer/de-serializer transceiver for use in a point-to-multipoint network having a first optical network unit transmitting at a first speed and a second optical network unit transmitting at a second speed different from the first speed, comprising:
    a clock recovery module that is configurable in real time to operate in a first mode capable of locking onto an incoming embedded clock within a received signal generated by the first optical network unit at the first speed, and in a second mode capable of locking onto an incoming embedded clock within a received signal generated by the second optical network unit at the second speed; and
    configuration registers that store a first parameter for the configuration of a clock multiplier/divider at a first value for use by said clock recovery module in said first mode and a second parameter for the configuration of said clock multiplier/divider at a second value for use by said clock recovery module in said second mode,
    wherein a configuration of said clock multiplier/divider for a particular received signal is based on a selection of only one of said first value or said second value, said selection being based on a speed indication of said particular received signal made available to the multi-speed serializer/de-serializer transceiver.

2. The multi-speed serializer/de-serializer transceiver of claim 1, wherein said speed indication is provided through one or more external pins to the multi-speed serializer/de-serializer transceiver.

3. The multi-speed serializer/de-serializer transceiver of claim 1, wherein said clock recovery module includes a phase locked loop.

4. The multi-speed serializer/de-serializer transceiver of claim 1, wherein said clock recovery module includes a delay locked loop.

5. The multi-speed serializer/de-serializer transceiver of claim 1, wherein communication from the first optical network unit and the second optical network unit are received on different time slots.

6. The multi-speed serializer/de-serializer transceiver of claim 1, wherein said speed indication is provided through an EPROM.

7. The multi-speed serializer/de-serializer transceiver of claim 1, wherein said speed indication is provided through in-band communication to the multi-speed serializer/de-serializer transceiver.

8. A multi-speed serializer/de-serializer, comprising:
a clock recovery module that is configurable in real time to operate in a plurality of modes, wherein a first of said plurality of modes is capable of locking onto an incoming embedded clock within signals generated by a first optical network unit in a first time slot at a first speed, and a second of said plurality of modes is capable of locking onto an incoming embedded clock within signals generated by a second optical network unit in a second time slot at a second speed different from said first speed,
wherein said clock recovery module is configured to operate in only one of said plurality of modes for each time slot, said operating mode for a particular time slot being selected based on a speed indication for said particular time slot that is made available to the multi-speed serializer/de-serializer.

9. The multi-speed serializer/de-serializer of claim 8, further comprising configurable registers that store parameters for said first mode and said second mode.

10. The multi-speed serializer/de-serializer of claim 9, wherein said parameters are values for a clock multiplier/divider.

11. The multi-speed serializer/de-serializer of claim 8, wherein said clock recovery module includes a phase locked loop.

12. The multi-speed serializer/de-serializer of claim 8, wherein said clock recovery module includes a delay locked loop.

13. The multi-speed serializer/de-serializer of claim 8, wherein said speed indication is provided through one or more external pins to the multi-speed serializer/de-serializer transceiver.

14. The multi-speed serializer/de-serializer of claim 8, wherein said speed indication is provided through an EPROM.

15. The multi-speed serializer/de-serializer of claim 8, wherein said speed indication is provided through in-band communication to the multi-speed serializer/de-serializer transceiver.

16. A multi-speed serializer/de-serializer method, comprising:
identifying first operating speed of a first signal received from a first optical network unit on a first time slot;
configuring in real time, based on said identified first operating speed, a clock recovery module of a serializer/de-serializer to operate in a first of a plurality of operating modes, wherein said first operating mode is capable of locking onto an incoming embedded clock within a signal generated by a first optical network unit operating at said first operating speed;
identifying a second operating speed of a second signal received from a second optical network unit on a second time slot consecutively following said first time slot; and
reconfiguring in real time, based on said second identified operating speed, said clock recovery module to change from said first operating mode to a second of said plurality of operating modes, wherein said second operating mode is capable of locking onto an incoming embedded clock within a signal generated by a second optical network unit operating at said second operating speed different from said first operating speed.

17. The method of claim 16, wherein said configuring and reconfiguring comprises configuring a phase locked loop.

18. The method of claim 16, wherein said configuring and reconfiguring comprises configuring a delay locked loop.

19. The method of claim 16, wherein said identifying is based on an assigned time slot.

20. The method of claim 16, wherein said configuring and reconfiguring comprises configuring a clock multiplier/divider.

* * * * *